United States Patent
Sugawara et al.

(10) Patent No.: US 8,808,939 B2
(45) Date of Patent: Aug. 19, 2014

(54) FUEL CELL STACK AND FUEL CELL COGENERATION SYSTEM INCLUDING THE SAME

(75) Inventors: Yasushi Sugawara, Osaka (JP); Takahiro Umeda, Nara (JP); Soichi Shibata, Osaka (JP)

(73) Assignee: Panasonic Corporation, Osaka (JP)

( * ) Notice: Subject to any disclaimer, the term of this patent is extended or adjusted under 35 U.S.C. 154(b) by 637 days.

(21) Appl. No.: 13/056,234

(22) PCT Filed: Apr. 20, 2010

(86) PCT No.: PCT/JP2010/002840
§ 371 (c)(1),
(2), (4) Date: Jan. 27, 2011

(87) PCT Pub. No.: WO2010/122779
PCT Pub. Date: Oct. 28, 2010

(65) Prior Publication Data
US 2011/0171556 A1     Jul. 14, 2011

(30) Foreign Application Priority Data
Apr. 22, 2009 (JP) .................................. 2009-103887

(51) Int. Cl.
*H01M 8/04* (2006.01)
*H01M 8/24* (2006.01)

(52) U.S. Cl.
USPC ........... 429/459; 429/452; 429/458; 429/490; 429/512; 429/514

(58) Field of Classification Search
USPC .......................... 429/452, 456–459, 512–514
IPC ............. H01M 8/04029,8/242, 8/0202, 8/0258, H01M 8/04089, 8/04, 8/04201, 8/0662, 8/2475, H01M 8/2485, 2008/1095, 2250/405; Y02B 90/16; Y02E 60/50
See application file for complete search history.

(56) References Cited

U.S. PATENT DOCUMENTS

| | | | |
|---|---|---|---|
| 6,261,710 B1 | 7/2001 | Marianowski | |
| 2004/0106028 A1 | 6/2004 | Sugiura et al. | |
| 2005/0048338 A1* | 3/2005 | Kobayashi et al. | 429/26 |
| 2008/0138684 A1* | 6/2008 | Lewinski et al. | 429/32 |

FOREIGN PATENT DOCUMENTS

| | | |
|---|---|---|
| EP | 1 255 315 A1 | 11/2002 |
| JP | 08-273696 | 10/1996 |

(Continued)

OTHER PUBLICATIONS

Extended European Search Report issued in European Application No. 10766841.0 dated May 13, 2014.

*Primary Examiner* — A. Echelmeyer
(74) *Attorney, Agent, or Firm* — McDermott Will & Emery LLP

(57) ABSTRACT

A fuel cell cogeneration system of the present invention includes: a cell (10); a fuel gas discharging manifold (122) which is formed to extend in a thickness direction of the cell (10) and through which an anode off gas unconsumed in an anode (2A) flows; an oxidizing gas discharging manifold (124) which is formed to extend in the thickness direction of the cell (10) and through which a cathode off gas unconsumed in a cathode (2B) flows; and a cooling medium discharging manifold (126) which is formed to extend in the thickness direction of the cell (10) and through which an off cooling medium having recovered heat from the cell (10) flows, and the fuel gas discharging manifold (122) and/or the oxidizing gas discharging manifold (124) are formed between the cooling medium discharging manifold (126) and a separator end closest to the cooling medium discharging manifold (126).

20 Claims, 9 Drawing Sheets

(56) References Cited

FOREIGN PATENT DOCUMENTS

| JP | 2000-087344 | 3/2000 |
| JP | 2002-190313 | 7/2002 |
| JP | 2005-353580 | 12/2005 |
| JP | 2006-114444 | 4/2006 |
| JP | 2007-026928 | 2/2007 |
| JP | 2008-130261 | 6/2008 |
| JP | 2008-293696 | * 12/2008 |
| JP | 2008-293766 | 12/2008 |

* cited by examiner

FUEL CELL STACK AND FUEL CELL COGENERATION SYSTEM INCLUDING THE SAME

RELATED APPLICATIONS

This application is the U.S. National Phase under 35 U.S.C. §371 of International Application No. PCT/JP2010/002840, filed on Apr. 20, 2010, which in turn claims the benefit of Japanese Application No. 2009-103887, filed on Apr. 22, 2009, the disclosures of which Applications are incorporated by reference herein.

TECHNICAL FIELD

The present invention relates to the configuration of a fuel cell stack and the configuration of a fuel cell cogeneration system including the fuel cell stack, and particularly to the configuration of the fuel cell stack.

BACKGROUND ART

Conventionally known is a domestic fuel cell cogeneration system including: an electric power generator utilizing a fuel cell; and a hot water tank configured to store water (hot water) heated by utilizing heat generated when the electric power generator generates electric power. The fuel cell used in the fuel cell cogeneration system includes a cell stack body formed by stacking plate-shaped cells. An electrode is provided at a center portion of the cell, and respective manifold holes, such as a fuel gas supplying manifold hole, are generally formed at a peripheral portion of the cell. When the cells are stacked, respective manifold holes are connected to one another to form respective manifolds, such as a fuel gas supplying manifold.

As above, since the manifolds are formed at the peripheral portion in the fuel cell, the heat is easily released from a cooling medium, which has recovered the heat, to the atmosphere. Therefore, in order to reduce the heat release from the fuel cell, known are a fuel cell (see PTLs 1 and 2, for example) in which a heat insulating member is arranged outside the fuel cell stack and a fuel cell (see PTL 3, for example) in which the fuel cell stack is contained in a closed container, and an internal space of the closed container is filled with an electrically insulating liquid.

CITATION LIST

Patent Literature
PTL 1: Japanese Laid-Open Patent Application Publication No. 2000-87344
PTL 2: Japanese Laid-Open Patent Application Publication No. 2008-130261
PTL 3: Japanese Laid-Open Patent Application Publication No. 2002-190313

SUMMARY OF INVENTION

Technical Problem

However, even in the fuel cells disclosed in PTLs 1 to 3, countermeasures against the heat released from the fuel cell stack are inadequate, and a low exhaust heat recovery efficiency is a problem. Moreover, in a case where a vacuum insulating structure is adopted or the amount of heat insulating material is increased to improve a heat insulating efficiency, the cost and size of the fuel cell become problems. As above, the countermeasures against the heat release in the conventional fuel cells are inadequate, and there is still room for improvement.

The present invention was made to solve the above problems, and an object of the present invention is to provide a fuel cell stack having an improved exhaust heat recovery efficiency and an excellent energy efficiency.

Solution to Problem

In order to solve the above problems, a fuel cell stack according to the present invention includes: one or a plurality of cells stacked, each of the cells including an anode and a cathode and being formed to have a plate shape; a fuel gas discharging manifold which is formed to extend in a thickness direction of the cell and through which an anode off gas unconsumed in the anode flows; an oxidizing gas discharging manifold which is formed to extend in the thickness direction of the cell and through which a cathode off gas unconsumed in the cathode flows; and a cooling medium discharging manifold which is formed to extend in the thickness direction of the cell and through which an off cooling medium having recovered heat from the cell flows, wherein when viewed from the thickness direction of the cell, the cathode gas discharging manifold and/or the anode gas discharging manifold are formed between the cooling medium discharging manifold and a separator end closest to the cooling medium discharging manifold.

With this, the fuel gas discharging manifold and/or the oxidizing gas discharging manifold, through each of which a gas flows and each of which has a small heat capacity, also serve as a heat insulating body of the cooling medium discharging manifold, through which a liquid flows and which has a large heat capacity. Therefore, the amount of heat released from the cooling medium discharging manifold to the outside air can be reduced, and the heat recovery efficiency of the fuel cell stack can be improved.

Moreover, in the fuel cell stack according to the present invention, it is preferable that the fuel gas discharging manifold and/or the oxidizing gas discharging manifold be formed to form a concave portion when viewed from the thickness direction of the cell, and the cooling medium discharging manifold be formed such that at least a part thereof fits in the concave portion.

Moreover, in the fuel cell stack according to the present invention, the fuel gas discharging manifold and the oxidizing gas discharging manifold may be formed to form the concave portion when viewed from the thickness direction of the cell.

Moreover, in the fuel cell stack according to the present invention, the oxidizing gas discharging manifold may be formed to form the concave portion when viewed from the thickness direction of the cell.

Moreover, in the fuel cell stack according to the present invention, the fuel gas discharging manifold may be formed to form the concave portion when viewed from the thickness direction of the cell.

Moreover, in the fuel cell stack according to the present invention, the entire cooling medium discharging manifold may be formed to fit in the concave portion.

Moreover, in the fuel cell stack according to the present invention, the concave portion may be open to an inner side of the cell.

Moreover, in the fuel cell stack according to the present invention, the cooling medium discharging manifold may be formed to overlap the fuel gas discharging manifold and/or the oxidizing gas discharging manifold when viewed from a vertical direction relative to a stack direction of the cells.

Moreover, in the fuel cell stack according to the present invention, at least a part of the cathode gas discharging manifold and/or at least a part of the anode gas discharging manifold may be formed in a region located between the cooling medium discharging manifold and the separator end closest to the cooling medium discharging manifold.

Moreover, in the fuel cell stack according to the present invention, the fuel cell stack may be covered with a heat insulating member.

Moreover, in the fuel cell stack according to the present invention, the fuel gas discharging manifold, the oxidizing gas discharging manifold, and the cooling medium discharging manifold may be formed inside said one or a plurality of cells stacked.

Further, in the fuel cell stack according to the present invention, the fuel gas discharging manifold, the oxidizing gas discharging manifold, and the cooling medium discharging manifold may be formed outside said one or a plurality of cells stacked.

Moreover, a fuel cell cogeneration system according to the present invention includes: the fuel cell stack; an anode off gas pipe connected to a downstream end of the fuel gas discharging manifold from which the anode off gas is discharged; a cathode off gas pipe connected to a downstream end of the oxidizing gas discharging manifold from which the cathode off gas is discharged; an off cooling medium pipe connected to a downstream end of the cooling medium discharging manifold from which the off cooling medium is discharged; and a heat exchanger configured to carry out heat exchange between the anode off gas and a heat medium or between the cathode off gas and the heat medium.

The above object, other objects, features and advantages of the present invention will be made clear by the following detailed explanation of preferred embodiments with reference to the attached drawings.

Advantageous Effects of Invention

In accordance with the fuel cell stack of the present invention and the fuel cell cogeneration system including the fuel cell stack, the fuel gas discharging manifold and/or the oxidizing gas discharging manifold, each having a small heat capacity, also serves as a heat insulating body of the cooling medium discharging manifold having a large heat capacity. With this, the amount of heat released from the cooling medium discharging manifold to the outside air can be reduced, and the heat recovery efficiency of the fuel cell stack, that is, the fuel cell cogeneration system can be improved.

DESCRIPTION OF EMBODIMENTS

Figure 1:
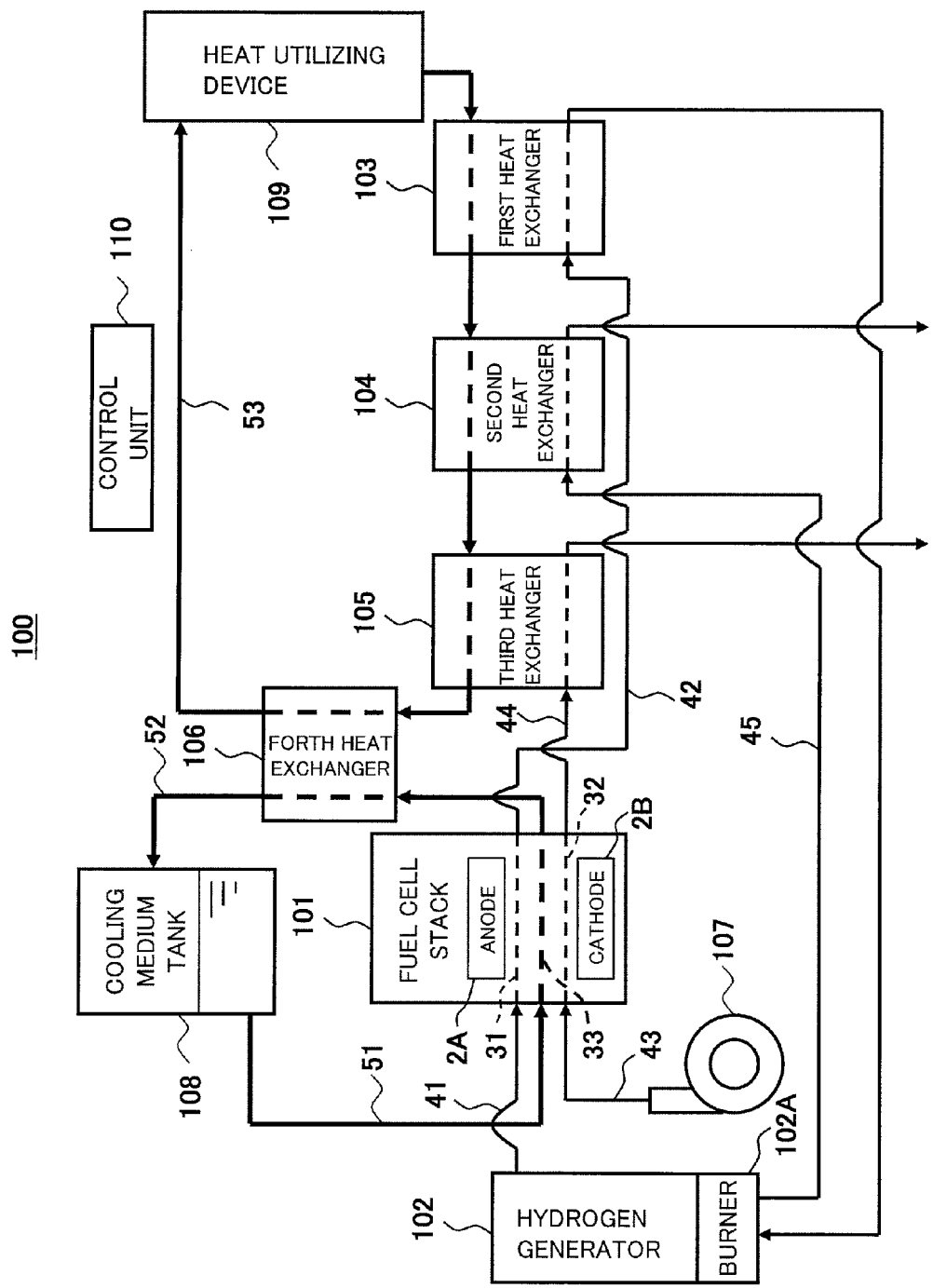
FIG. 1 is a schematic diagram showing the schematic configuration of a fuel cell cogeneration system according to Embodiment 1 of the present invention.

Hereinafter, preferred embodiments of the present invention will be explained in reference to the drawings. In the drawings, the same reference signs are used for the same or corresponding components, and a repetition of the same explanation is avoided. In addition, in the drawings, only the components necessary for explaining the present invention are shown, and the other components are omitted. Further, the present invention is not limited to the following embodiments.

Embodiment 1

Embodiment 1 of the present invention exemplifies a mode in which a fuel gas discharging manifold and an oxidizing gas discharging manifold are interposed between a cooling medium discharging manifold and a separator end closest to the cooling medium discharging manifold.

First, a fuel cell cogeneration system according to Embodiment 1 of the present invention will be explained in reference to FIG. 1.

Figure 2:
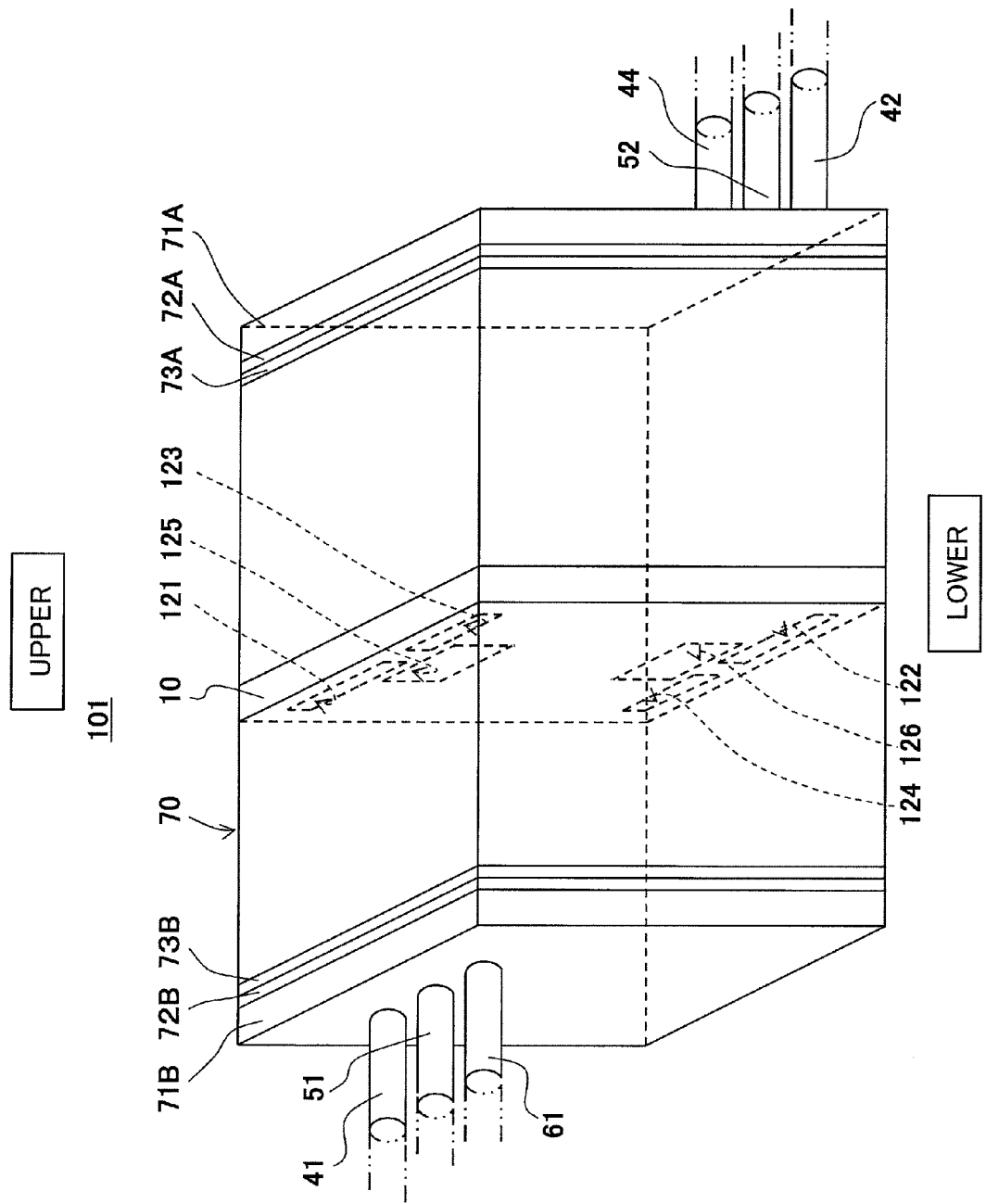
FIG. 2 is a perspective view schematically showing the schematic configuration of a fuel cell stack according to Embodiment 1 of the present invention.

FIG. 1 is a schematic diagram showing the schematic configuration of the fuel cell cogeneration system according to Embodiment 1 of the present invention. FIG. 2 is a perspective view schematically showing the schematic configuration of a fuel cell stack according to Embodiment 1 of the present invention. In FIG. 2, an upper-lower direction of the fuel cell stack is shown as an upper-lower direction of the drawing, and a part of the fuel cell stack is omitted.

As shown in FIG. 1, a fuel cell cogeneration system 100 according to Embodiment 1 of the present invention includes a fuel cell stack 101, an anode off gas pipe 42, a cathode off gas pipe 44, an off cooling medium pipe 52, and a first heat exchanger 103 and third heat exchanger 105 as heat exchangers configured to utilize heat. Moreover, as shown in FIG. 2, the fuel cell stack 101 includes a plate-shaped cell 10 and a fuel gas discharging manifold 122, an oxidizing gas discharging manifold 124, and a cooling medium discharging manifold 126, which are formed to extend in a thickness direction of the cell 10.

To be specific, in the fuel cell cogeneration system 100 of the present invention, the fuel cell stack 101 may include the cell 10, be constituted by one cell 10, or be constituted by a cell stack body 70 formed by stacking a plurality of cells 10. Moreover, the type of the fuel cell stack 101 is not especially limited as long as the fuel cell stack is configured to be cooled down. For example, as the fuel cell stack 101, a solid polymer electrolyte fuel cell, a solid oxide fuel cell, a phosphoric-acid fuel cell, a molten carbonate fuel cell, or the like may be used.

Moreover, the fuel cell cogeneration system 100 of the present invention may include the first heat exchanger 103 and the third heat exchanger 105, each of which is configured to utilize heat, and does not have to include a heat utilizing device. For example, in a case where the fuel cell cogeneration system 100 externally supplies a heat medium for utilizing heat, the heat utilizing device is unnecessary. The following will explain en example in which the fuel cell cogeneration system 100 includes the heat utilizing device.

Next, the configuration of the fuel cell cogeneration system 100 according to Embodiment 1 will be explained in detail in reference to FIG. 1.

Configuration of Fuel Cell Cogeneration System

As shown in FIG. 1, for example, the fuel cell cogeneration system 100 according to Embodiment 1 includes the fuel cell stack 101, a hydrogen generator 102, first to fourth heat exchangers 103 to 106 for utilizing heat, an air supplying device 107, a heat utilizing device 109, and a control unit 110. Moreover, the fuel cell cogeneration system 100 is configured to supply to a user electric power and heat generated by the fuel cell 101.

The fuel cell stack 101 includes an anode 2A, a cathode 2B, a fuel gas internal channel 31, an oxidizing gas internal channel 32, and a cooling medium internal channel 33. The fuel gas internal channel 31 is configured to supply an anode gas to the anode 2A, and the oxidizing gas internal channel 32 is configured to supply a cathode gas to the cathode 2B. Moreover, the cooling medium internal channel 33 is configured such that a cooling medium recovers heat generated in the fuel cell stack 101. A detailed configuration of the fuel cell stack 101 will be described later.

For example, the hydrogen generator 102 includes a reformer, a shift converter, a purifier (which are not shown), and a burner 102A. The hydrogen generator 102 generates a hydrogen-containing anode gas from a material gas (for example, a gas, such as methane, containing an organic compound constituted by carbon and hydrogen) and water. The hydrogen generator 102 is connected to an upstream end of the fuel gas internal channel 31 of the fuel cell stack 101 via an anode gas pipe 41. A downstream end of the fuel gas internal channel 31 is connected to the burner 102A via the anode off gas pipe 42. Moreover, a flue gas pipe 45 is connected to the burner 102A. The first heat exchanger 103 is disposed on a portion of the anode off gas pipe 42, and a second heat exchanger 104 is disposed on a portion of the flue gas pipe 45.

With this, the anode gas generated by the hydrogen generator 102 is supplied through the anode gas pipe 41 to the fuel gas internal channel 31. Then, the anode gas unconsumed in the anode 2A (such gas is referred to as an "anode off gas") is supplied through the anode off gas pipe 42 to the burner 102A and is combusted in the burner 102A. A flue gas generated by combusting the anode off gas in the burner 102A is discharged to the outside of the fuel cell cogeneration system 100 (to the atmosphere).

If it is unnecessary to further reduce carbon monoxide contained in a hydrogen-containing gas generated by the reformer, the shift converter and the purifier may not be provided. For example, in a case where the fuel cell stack 101 is a device (for example, a solid oxide fuel cell) which is less likely to be poisoned by carbon monoxide, the shift converter and the purifier may not be provided.

Moreover, as the air supplying device 107, a fan, such as a blower or a sirocco fan, can be used. The air supplying device 107 is connected to an upstream end of the oxidizing gas internal channel 32 of the fuel cell stack 101 via a cathode gas pipe 43. Moreover, a downstream end of the oxidizing gas internal channel 32 is connected to the cathode off gas pipe 44. The third heat exchanger 105 is disposed on a portion of the cathode off gas pipe 44.

With this, the cathode gas is supplied from the air supplying device 107 through the cathode gas pipe 43 to the oxidizing gas internal channel 32. Then, the cathode gas unconsumed in the cathode 2B (such gas is referred to as a "cathode off gas") is discharged through the cathode off gas pipe 44 to the atmosphere.

Moreover, the fuel cell cogeneration system 100 includes a cooling medium tank 108 configured to store a cooling medium. The cooling medium tank 108 is connected to an upstream end of the cooling medium internal channel 33 of the fuel cell stack 101 via a cooling medium pipe 51. Moreover, a downstream end of the cooling medium internal channel 33 is connected to the cooling medium tank 108 via the off cooling medium pipe 52. Here, the cooling medium may be water, an antifreezing fluid (for example, an ethylene glycol-containing liquid), or the like. A fourth heat exchanger 106 is disposed on a portion of the off cooling medium pipe 52.

With this, by a cooling medium pump, not shown, the cooling medium is supplied from the cooling medium tank 108 through the cooling medium pipe 51 to the cooling medium internal channel 33. While the cooling medium supplied to the cooling medium internal channel 33 flows through the cooling medium internal channel 33, it recovers the heat generated in the fuel cell stack 101 and is then discharged to the off cooling medium pipe 52. The cooling medium having recovered the heat generated in the fuel cell stack 101 and been discharged to the off cooling medium pipe 52 (such cooling medium is referred to as an "off cooling medium") flows through the off cooling medium pipe 52 and returns to the cooling medium tank 108.

A material of each of the anode gas pipe 41 and the anode off gas pipe 42 may be a metal, such as SUS. Moreover, a material of each of the cathode gas pipe 43, the cathode off gas pipe 44, the cooling medium pipe 51, and the off cooling medium pipe 52 is not especially limited but may be resin, such as tetrafluoroethylene perfluoro alkyl vinyl ether copolymer (PFA), polytetrafluoroethylene (PTFE), polyphenylene sulfide (PPS), polyoxymethylene (POM), polyether imide (PEI), polysulfone (PSF), or polypropylene (PP).

Moreover, the fuel cell cogeneration system 100 includes the heat utilizing device 109, a heat medium circulating passage 53, and a heat medium pump, not shown. The heat medium circulating passage 53 is configured such that the heat utilizing device 109 is disposed thereon and a heat medium (such as water or an antifreezing fluid) flows therethrough. Here, examples of the heat utilizing device 109 are hot water supply and floor heating. In this case, for example, the heat medium circulating passage 53 may be connected to a heat accumulator (hot water tank) or a path of the floor heating.

In Embodiment 1, the first heat exchanger 103, the second heat exchanger 104, the third heat exchanger 105, and the fourth heat exchanger 106 are disposed in this order on portions of the heat medium circulating passage 53. The first heat exchanger 103 is configured to carry out heat exchange between the heat medium and the anode off gas, and the second heat exchanger 104 is configured to carry out the heat exchange between the heat medium and the flue gas. Moreover, the third heat exchanger 105 is configured to carry out the heat exchange between the heat medium and the cathode off gas, and the fourth heat exchanger 106 is configured to carry out the heat exchange between the heat medium and the cooling medium. With this, while the heat medium flows through the heat medium circulating passage 53, it is heated by the heat exchange with the anode off gas, the flue gas, the cathode off gas, and the cooling medium and is then supplied to the heat utilizing device 109.

In Embodiment 1, the first heat exchanger 103, the second heat exchanger 104, the third heat exchanger 105, and the fourth heat exchanger 106 are disposed in this order on portions of the heat medium circulating passage 53. However, the order of the heat exchangers is not limited to this. In order to efficiently carry out the heat exchange, it is preferable that the heat exchangers be disposed in the above order.

For example, the control unit 110 is constituted by a computer, such as a microcomputer, and carries out various control operations of the fuel cell cogeneration system 100.

Configuration of Fuel Cell Stack

Next, one example of the configuration of the fuel cell stack 101 will be explained in detail in reference to FIG. 2.

As shown in FIG. 2, the fuel cell stack 101 includes the cell stack body 70, end plates 71A and 71B, and fastening members (not shown). The cell stack body 70 is formed by stacking a plurality of plate-shaped cells 10. The end plates 71A and 71B are respectively disposed on both ends of the cell stack body 70. The fastening members fasten the cell stack body 70 and the end plates 71A and 71B in a stack direction of the cells. Moreover, an insulating plate 72A and a current collector 73A are provided between the end plate 71A and the cell stack body 70. Similarly, an insulating plate 72B and a current collector 73B are provided between the end plate 71B and the cell stack body 70. Further, a heat insulating member 61 is provided on a side surface of the fuel cell stack 101 so as to cover the fuel cell stack 101 (see FIG. 4).

The cell stack body 70 is provided with a fuel gas supplying manifold 121, an oxidizing gas supplying manifold 123, a cooling medium supplying manifold 125, a fuel gas discharging manifold 122, an oxidizing gas discharging manifold 124, and a cooling medium discharging manifold 126. Moreover, through holes corresponding to (communicated with) the fuel gas supplying manifold 121, the oxidizing gas supplying manifold 123, and the cooling medium supplying manifold 125 are formed on an upper portion of each of the end plate 71B, the insulating plate 72B, and the current collector 73B. Moreover, through holes corresponding to (communicated with) the fuel gas discharging manifold 122, the oxidizing gas discharging manifold 124, and the cooling medium discharging manifold 126 are formed on a lower portion of each of the end plate 71A, the insulating plate 72A, and the current collector 73A.

Then, the anode gas pipe 41, the cathode gas pipe 43, and the cooling medium pipe 51 are respectively connected to the through hole corresponding to the fuel gas supplying manifold 121 of the end plate 71B, the through hole corresponding to the oxidizing gas supplying manifold 123 of the end plate 71B, and the through hole corresponding to the cooling medium supplying manifold 125 of the end plate 71B by suitable means. Similarly, the anode off gas pipe 42, the cathode off gas pipe 44, and the off cooling medium pipe 52 are respectively connected to the through hole corresponding to the fuel gas discharging manifold 122 of the end plate 71A, the through hole corresponding to the oxidizing gas discharging manifold 124 of the end plate 71A, and the through hole corresponding to the cooling medium discharging manifold 126 of the end plate 71A by suitable means.

Configuration of Cell Stack Body

Figure 3:
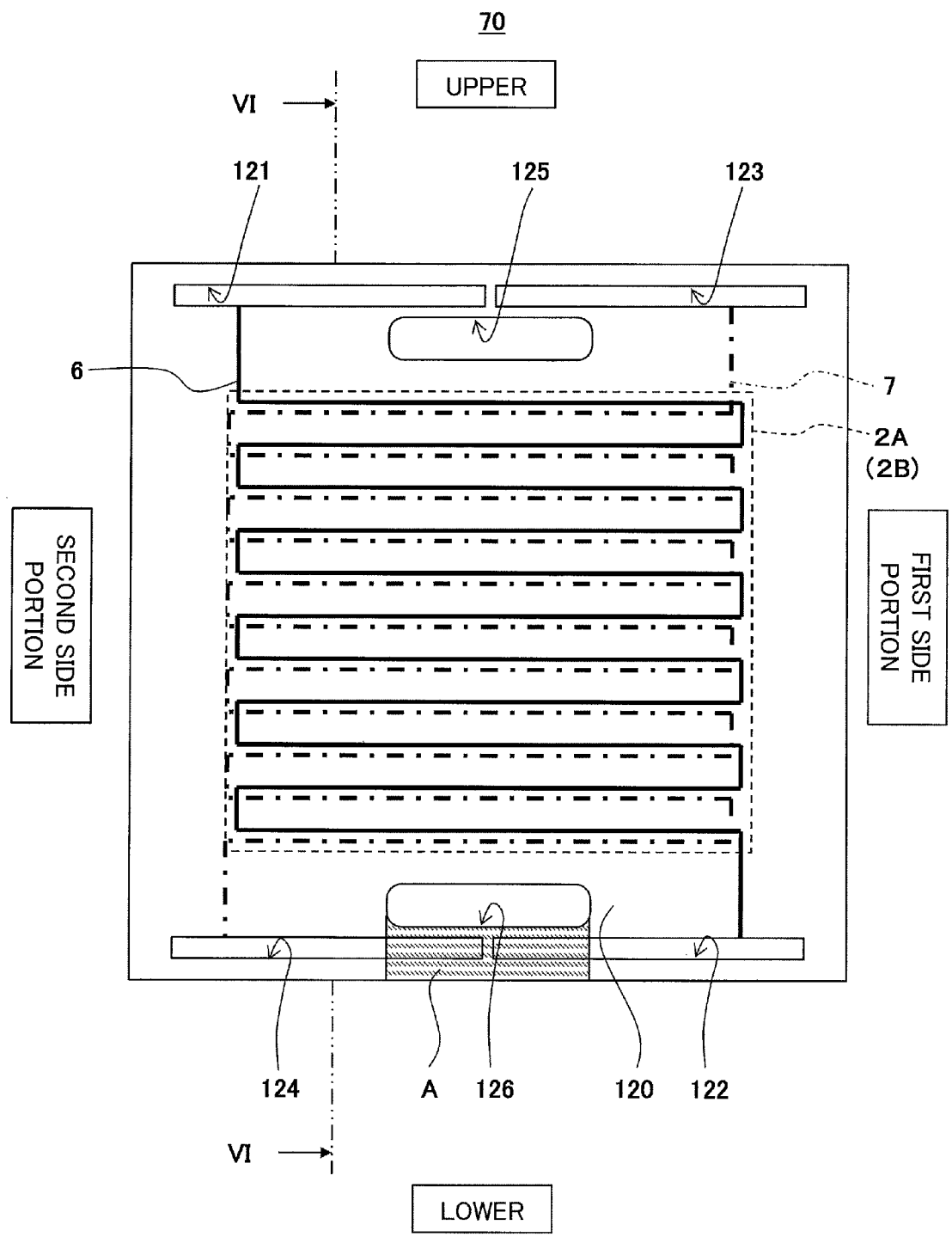
FIG. 3 is a transparent view of a cell stack body of the fuel cell stack of FIG. 2 when viewed from a thickness direction of a cell.
Figure 4:
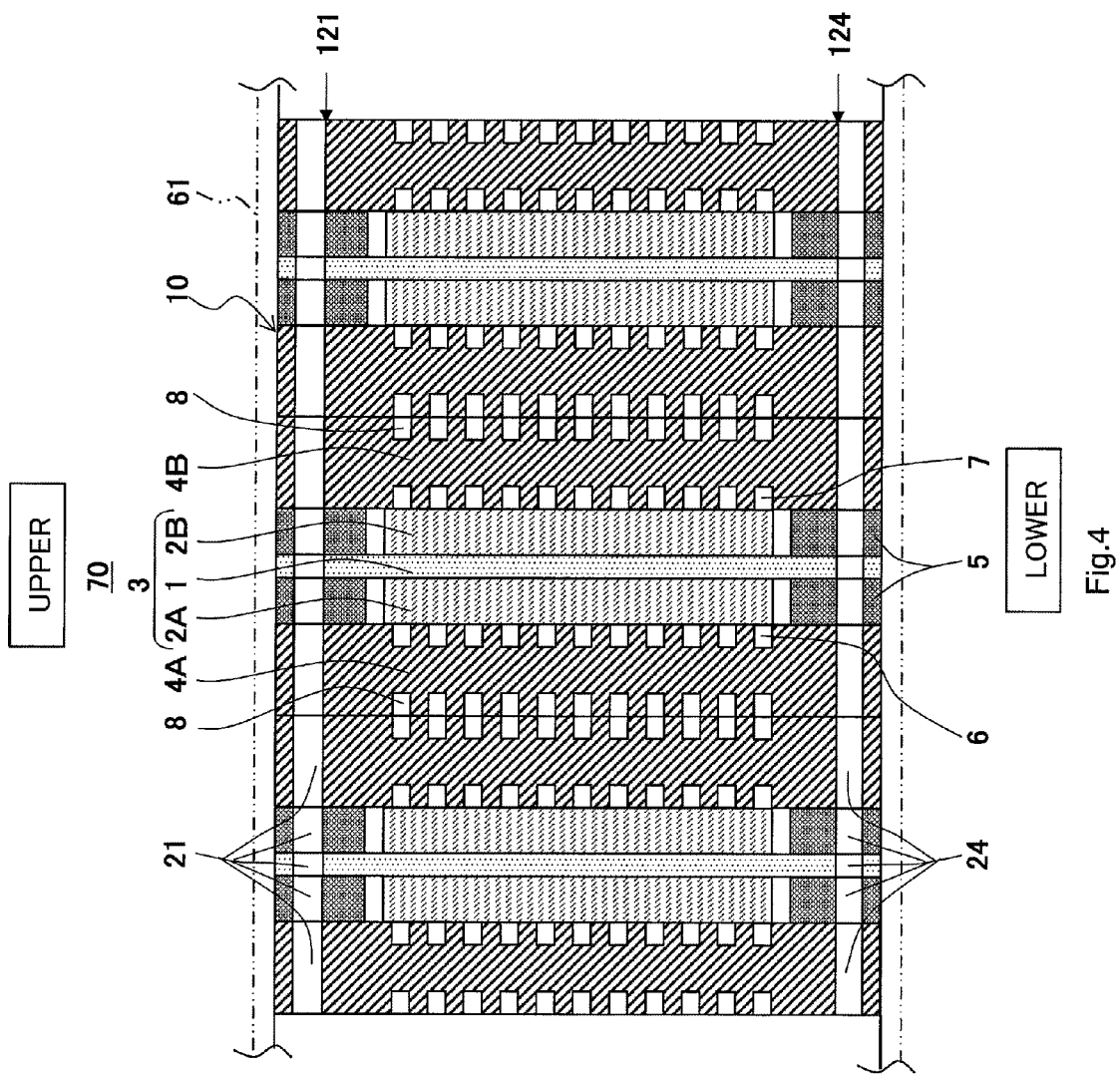
FIG. 4 is a cross-sectional view taken along line VI-VI of FIG. 3.

Next, the configuration of the cell stack body 70 will be explained in reference to FIGS. 3 and 4. FIG. 3 is a transparent view of the cell stack body 70 of the fuel cell stack 101 of FIG. 2 when viewed from the thickness direction of the cell 10. FIG. 4 is a cross-sectional view taken along line VI-VI of FIG. 3. In FIGS. 3 and 4, an upper-lower direction of the cell stack body 70 is shown as an upper-lower direction of the drawing, and a part of the cell stack body 70 is omitted.

As described above, the cell stack body 70 is formed by stacking the plate-shaped cells 10 in the thickness direction. First, the configuration of the cell 10 will be explained.

In Embodiment 1, the cell 10 is constituted by a polymer electrolyte fuel cell. As shown in FIG. 4, the cell 10 includes a MEA (Membrane-Electrode Assembly) 3, a pair of gaskets 5, an anode separator 4A, and a cathode separator 4B. Moreover, the MEA 3 includes a polymer electrolyte membrane 1, the anode 2A, and the cathode 2B. A fuel gas supplying manifold hole 21, an oxidizing gas supplying manifold hole (not shown), a cooling medium supplying manifold hole (not shown), a fuel gas discharging manifold hole (not shown), an oxidizing gas discharging manifold hole 24, and a cooling medium discharging manifold hole (not shown) are formed on a peripheral portion of each of the polymer electrolyte membrane 1, the pair of gaskets 5, the anode separator 4A, and the cathode separator 4B.

A fuel gas channel 6 through which the anode gas flows is formed on a main surface (hereinafter referred to as an "inner surface") of the anode separator 4A, the main surface contacting the anode 2A. The fuel gas channel 6 is formed such that an upstream end and downstream end thereof are respectively connected to the fuel gas supplying manifold hole 21 and the fuel gas discharging manifold hole. A cooling medium channel 8 through which the cooling medium flows is formed on a main surface (hereinafter referred to as an "outer surface") of the anode separator 4A, the main surface being opposite to the above inner surface. The cooling medium channel 8 is formed such that an upstream end and downstream end thereof are respectively connected to the cooling medium supplying manifold hole and the cooling medium discharging manifold hole. Similarly, an oxidizing gas channel 7 through which the cathode gas flows is formed on a main surface (hereinafter referred to as an "inner surface") of the cathode separator 4B, the main surface contacting the cathode 2B. The oxidizing gas channel 7 is formed such that an upstream end and downstream end thereof are respectively connected to the oxidizing gas supplying manifold hole and the oxidizing gas discharging manifold hole 24. The cooling medium channel 8 is formed on a main surface (hereinafter referred to as an "outer surface") of the cathode separator 4B, the main surface being opposite to the above inner surface. The cooling medium channel 8 is formed such that the upstream end and downstream end thereof are respectively connected to the cooling medium supplying manifold hole and the cooling medium discharging manifold hole.

In Embodiment 1, each channel is formed in a serpentine shape but is not limited to this. The channels may have any shape as long as the fluid flows through the entire anode 2A and the entire cathode 2B. For example, each channel may be formed to have a spiral shape. Moreover, in Embodiment 1, each channel is constituted by one groove but is not limited to this. For example, each channel may be constituted by a plurality of grooves.

Then, when the cells are stacked on one another, the manifold holes, such as the fuel gas supplying manifold hole 21, formed on the cells 10 are connected to one another to form the manifolds, such as the fuel gas supplying manifold 121.

Next, the shapes of the manifolds of the cell stack body 70 will be explained.

As shown in FIGS. 2 and 3, the fuel gas discharging manifold 122, the oxidizing gas discharging manifold 124, and the cooling medium discharging manifold 126 are formed at a lower portion of the cell stack body 70 so as to extend in the thickness direction of the cell 10 (in the stack direction of the cells 10). Then, the fuel gas discharging manifold 122 and the oxidizing gas discharging manifold 124 are formed between the cooling medium discharging manifold 126 and a separator end (lower end surface in FIG. 3) closest to the cooling medium discharging manifold 126. Here, the "separator end closest to the cooling medium discharging manifold" denotes a separator end which is the shortest in distance from the cooling medium discharging manifold 126 and is the largest in amount of heat released from the cooling medium flowing through the cooling medium discharging manifold 126.

Specifically, the fuel gas discharging manifold 122 is formed at one side portion (hereinafter referred to as a "first side portion") of the cell stack body 70 and has a substantially rectangular shape when viewed from the thickness direction of the cell 10. Similarly, the oxidizing gas discharging manifold 124 is formed at the other side portion (hereinafter referred to as a "second side portion") of the cell stack body 70 and has a substantially rectangular shape when viewed from the thickness direction of the cell 10. Moreover, the cooling medium discharging manifold 126 is formed at a lower and substantially center portion of the cell stack body 70 and has a substantially rectangular shape when viewed from the thickness direction of the cell 10. When viewed from a vertical direction (herein, an upper-lower direction) relative to the stack direction of the cells 10, the cooling medium discharging manifold 126 is formed to overlap the fuel gas discharging manifold 122 and the oxidizing gas discharging manifold 124. In other words, at least a part of the cathode gas discharging manifold 124 and/or at least a part of the anode gas discharging manifold 122 (in Embodiment 1, a part of the cathode gas discharging manifold 124 and a part of the anode gas discharging manifold 122) are formed in a region A located between the cooling medium discharging manifold 126 and the separator end closest to the cooling medium discharging manifold 126.

In Embodiment 1, when viewed from the thickness direction of the cell 10, each of the fuel gas discharging manifold 122, the oxidizing gas discharging manifold 124, and the cooling medium discharging manifold 126 is formed to have the substantially rectangular shape but is not limited to this. Each manifold may have any shape. For example, when viewed from the thickness direction of the cell 10, each manifold may be formed to have a circular-arc shape.

With this, the heat release from the cooling medium flowing through the cooling medium discharging manifold 126 can be reduced. To be specific, each of the fuel gas discharging manifold 122 and the oxidizing gas discharging manifold 124, each having a small heat capacity since a gas having a small heat capacity flows therethrough, can also serve as a heat insulating body of the cooling medium discharging manifold 126 having a large heat capacity since a cooling medium (liquid) having a large heat capacity flows therethrough. Moreover, the heat transferred from the cooling medium discharging manifold 126 to the fuel gas discharging manifold 122 and/or the oxidizing gas discharging manifold 124 is recovered by the first heat exchanger 103 and/or the third heat exchanger 105. Therefore, the amount of heat released from the cooling medium discharging manifold 126 to the outside air can be reduced, and heat recovery efficiency of the fuel cell stack 101, that is, heat recovery efficiency of the fuel cell cogeneration system 100 can be improved.

Similarly, the fuel gas supplying manifold 121, the oxidizing gas supplying manifold 123, and the cooling medium supplying manifold 125 are formed at an upper portion of the cell stack body 70 so as to extend in the thickness direction of the cell 10 (the stack direction of the cell 10). Then, when viewed from the thickness direction of the cell 10, the fuel gas supplying manifold 121 and the oxidizing gas supplying manifold 123 are formed between the cooling medium supplying manifold 125 and a separator end closest to the cooling medium supplying manifold 125.

Specifically, the fuel gas supplying manifold 121 is formed at the second side portion of the cell stack body 70 and has a substantially rectangular shape when viewed from the thickness direction of the cell 10. Similarly, the oxidizing gas supplying manifold 123 is formed at the first side portion of the cell stack body 70 and has a substantially rectangular shape when viewed from the thickness direction of the cell 10. Moreover, the cooling medium supplying manifold 125 is formed at an upper and substantially center portion of the cell stack body 70 and has a substantially rectangular shape when viewed from the thickness direction of the cell 10. When viewed from the vertical direction (herein, the upper-lower direction) relative to the stack direction of the cells 10, the cooling medium supplying manifold 125 is formed to overlap the fuel gas supplying manifold 121 and the oxidizing gas supplying manifold 123.

In Embodiment 1, when viewed from the thickness direction of the cell 10, each of the fuel gas supplying manifold 121, the oxidizing gas supplying manifold 123, and the cooling medium supplying manifold 125 is formed to have the substantially rectangular shape but is not limited to this. Each manifold may have any shape. For example, when viewed from the thickness direction of the cell 10, each manifold may be formed to have a circular-arc shape.

Moreover, the fuel gas internal channel 31 is constituted by: the fuel gas supplying manifold 121; the through holes respectively formed on the end plate 71B, the insulating plate 72B, and the current collector 73B and corresponding to the fuel gas supplying manifold 121; the fuel gas channel 6; the fuel gas discharging manifold 122; and the through holes respectively formed on the end plate 71A, the insulating plate 72A, and the current collector 73A and corresponding to the fuel gas discharging manifold 122 (see FIG. 1). Moreover, the through hole formed on the end plate 71B and corresponding to the fuel gas supplying manifold 121 constitutes the upstream end of the fuel gas internal channel 31, and the through hole formed on the end plate 71A and corresponding to the fuel gas discharging manifold 122 constitutes the downstream end of the fuel gas internal channel 31.

Similarly, the oxidizing gas internal channel 32 is constituted by: the oxidizing gas supplying manifold 123; the through holes respectively formed on the end plate 71B, the insulating plate 72B, and the current collector 73B and corresponding to the oxidizing gas supplying manifold 123; the oxidizing gas channel 7; the oxidizing gas discharging manifold 124; and the through holes respectively formed on the end plate 71A, the insulating plate 72A, and the current collector 73A and corresponding to the oxidizing gas discharging manifold 124 (see FIG. 1). Moreover, the through hole formed on the end plate 71B and corresponding to the oxidizing gas supplying manifold 123 constitutes the upstream end of the oxidizing gas internal channel 32, and the through hole formed on the end plate 71A and corresponding to the oxidizing gas discharging manifold 124 constitutes the downstream end of the oxidizing gas internal channel 32.

Further, the cooling medium internal channel 33 is constituted by: the cooling medium supplying manifold 125; the through holes respectively formed on the end plate 71B, the insulating plate 72B, and the current collector 73B and corresponding to the cooling medium supplying manifold 125; the cooling medium channel 8; the cooling medium discharging manifold 126; and the through holes respectively formed on the end plate 71A, the insulating plate 72A, and the current collector 73A and corresponding to the cooling medium discharging manifold 126 (see FIG. 1). Moreover, the through hole formed on the end plate 71B and corresponding to the cooling medium supplying manifold 125 constitutes the upstream end of the cooling medium internal channel 33, and the through hole formed on the end plate 71A and corresponding to the cooling medium discharging manifold 126 constitutes the downstream end of the cooling medium internal channel 33.

Operations of Fuel Cell Cogeneration System

Next, the operations of the fuel cell cogeneration system 100 according to Embodiment 1 will be explained in reference to FIGS. 1 to 4. The following operations are executed such that the control unit 110 controls the fuel cell cogeneration system 100.

First, the anode gas is supplied from the hydrogen generator 102 through the anode gas pipe 41 to the fuel gas supplying manifold 121. Moreover, the cathode gas is supplied from the air supplying device 107 through the cathode gas pipe 43 to the oxidizing gas supplying manifold 123. While the anode gas supplied to the fuel gas supplying manifold 121 flows through the fuel gas supplying manifold 121, it is supplied through the fuel gas channel 6 of each cell 10 to the anode 2A. Moreover, while the cathode gas supplied to the oxidizing gas supplying manifold 123 flows through the oxidizing gas supplying manifold 123, it is supplied through the oxidizing gas channel 7 of each cell 10 to the cathode 2B.

Then, the anode gas supplied to the anode 2A and the cathode gas supplied to the cathode 2B electrochemically react with each other to generate electric power and heat. The generated electric power is suitably supplied to an electric power load (not shown).

Moreover, the anode gas unconsumed in the anode 2A is discharged as the anode off gas through the fuel gas internal channel 31 to the anode off gas pipe 42. While the anode off gas flows through the anode off gas pipe 42, it carries out the heat exchange with the heat medium in the first heat exchanger 103 (it heats the heat medium) and is then supplied to the burner 102A. The anode off gas is combusted in the burner 102A to generate the flue gas. While the generated flue gas flows through the flue gas pipe 45, it carries out the heat exchange with the heat medium in the second heat exchanger 104 (it heats the heat medium) and is then discharged to the outside of the fuel cell cogeneration system 100.

Moreover, the cathode gas unconsumed in the cathode 2B is discharged as the cathode off gas through the oxidizing gas internal channel 32 to the cathode off gas pipe 44. While the cathode off gas flows through the cathode off gas pipe 44, it carries out the heat exchange with the heat medium in the third heat exchanger 105 (it heats the heat medium) and is then discharged to the outside of the fuel cell cogeneration system 100.

The heat generated in the fuel cell stack 101 (cell 10) is recovered by the cooling medium. Specifically, while the cooling medium supplied from the cooling medium tank 108 through the cooling medium pipe 51 and the cooling medium supplying manifold 125 to the cooling medium channel 8 flows through the cooling medium channel 8, it recovers the heat generated in the fuel cell stack 101.

The cooling medium having recovered the heat is discharged as the off cooling medium from the downstream end of the cooling medium channel 8 to the cooling medium discharging manifold 126. While the off cooling medium discharged to the cooling medium discharging manifold 126 flows through the cooling medium discharging manifold 126, a part of the heat of the off cooling medium is transferred through the fuel gas discharging manifold 122 and the oxidizing gas discharging manifold 124 to the anode off gas and the cathode off gas by the structure of the manifolds shown in FIGS. 2 and 3. While the off cooling medium having flowed through the cooling medium discharging manifold 126 is discharged to the off cooling medium pipe 52 and flows through the off cooling medium pipe 52, it carries out the heat exchange with the heat medium in the fourth heat exchanger 106 (it heats the heat medium) and is then supplied to the cooling medium tank 108.

Then, the heat transferred from the off cooling medium to the anode off gas or the cathode off gas is recovered by the heat medium in the first heat exchanger 103 or the third heat exchanger 105 as described above (the heat heats the heat medium). The heated heat medium is supplied to the heat utilizing device 109.

As above, in the fuel cell stack 101 according to Embodiment 1, each of the fuel gas discharging manifold 122 and the oxidizing gas discharging manifold 124, each having a small heat capacity, can also serve as the heat insulating body of the cooling medium discharging manifold 126 having a large heat capacity, and the heat released from the cooling medium discharging manifold 126 to the outside air can be further reduced as compared to a fuel cell stack provided with a conventional heat insulating member.

Moreover, a part of the heat of the off cooling medium, which has conventionally been released to the atmosphere while the off cooling medium flows through the cooling medium discharging manifold 126, can be recovered by the anode off gas and the cathode off gas, this heat can be recovered by the heat medium in each of the first heat exchanger 103 and the third heat exchanger 105, and the heat can be transferred to the heat utilizing device 109. Therefore, in accordance with the fuel cell cogeneration system 100 of Embodiment 1, the amount of heat released from the cooling medium discharging manifold 126 to the outside air can be reduced, and the heat recovery efficiency of the fuel cell cogeneration system 100 can be improved.

Embodiment 2

Embodiment 2 of the present invention exemplifies a mode in which the cooling medium discharging manifold is formed to fit in a concave portion formed by the oxidizing gas discharging manifold.

Figure 5:
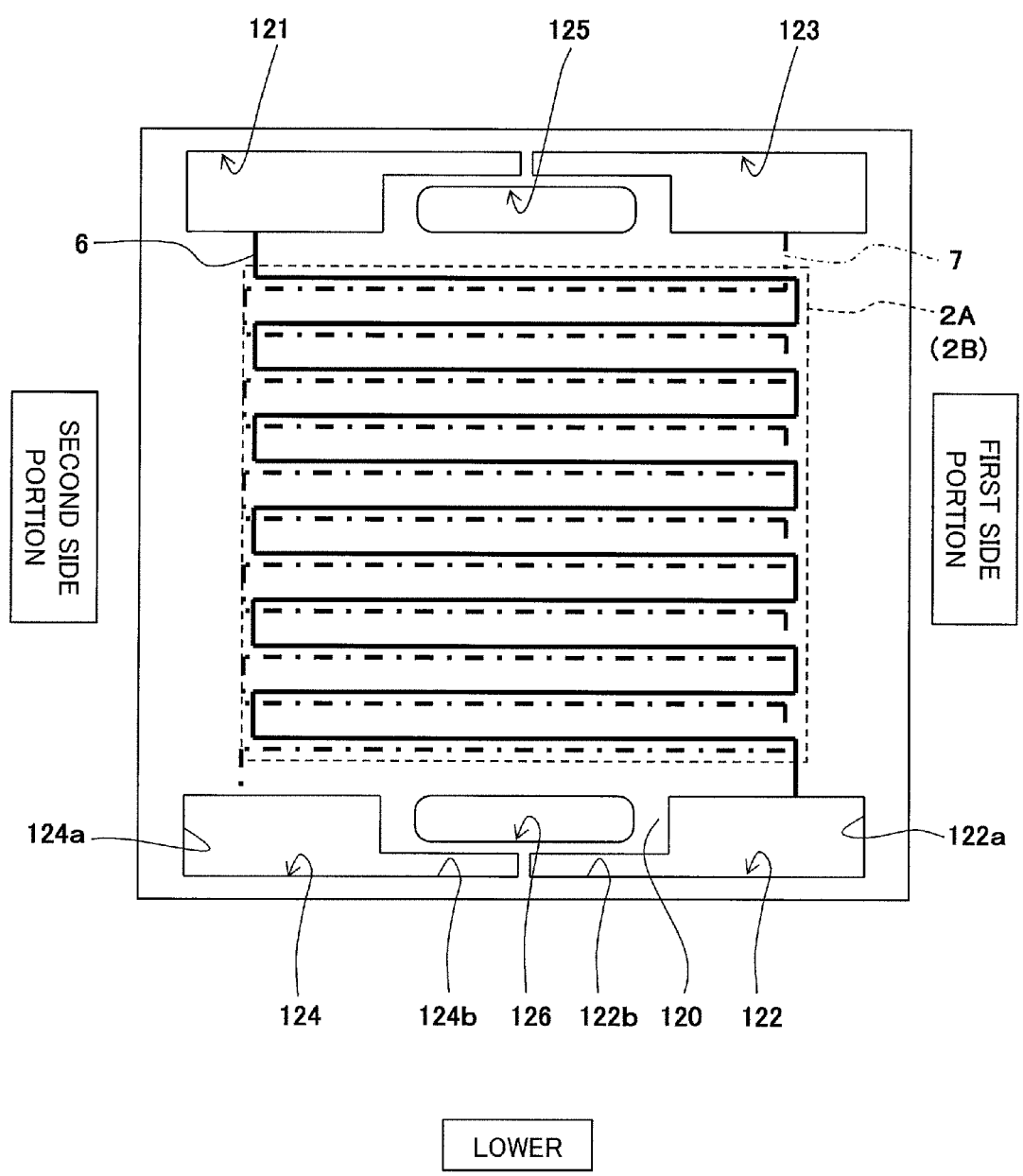
FIG. 5 is a transparent view of the cell stack body of the fuel cell stack according to Embodiment 2 of the present invention when viewed from the thickness direction of the cell.

FIG. 5 is a transparent view of the cell stack body of the fuel cell stack according to Embodiment 2 of the present invention when viewed from the thickness direction of the cell. In FIG. 5, the upper-lower direction of the cell stack body is shown as the upper-lower direction of the drawing, and a part of the cell stack body is omitted.

As shown in FIG. 5, the fuel cell stack 101 according to Embodiment 2 of the present invention is the same in basic configuration as the fuel cell stack 101 according to Embodiment 1 but is different from the fuel cell stack 101 according to Embodiment 1 regarding the configurations of the fuel gas supplying manifold 121, the oxidizing gas supplying manifold 123, the fuel gas discharging manifold 122, and the oxidizing gas discharging manifold 124. Hereinafter, details will be explained.

The fuel gas discharging manifold 122 and the oxidizing gas discharging manifold 124 are formed to form a concave portion 120, and the cooling medium discharging manifold 126 is formed such that at least a part thereof fits in the concave portion 120. Here, the sentence "at least a part of the cooling medium discharging manifold 126 fits in the concave portion 120" denotes that at least a part of the cooling medium discharging manifold 126 may be formed in the concave portion 120, in other words, the cooling medium discharging manifold 126 may be formed to protrude from the concave portion 120. To be specific, the above sentence denotes that when viewed from the thickness direction of the cell 10, at least a part of the cooling medium discharging manifold 126 is formed to be surrounded by the fuel gas discharging manifold 122 and/or the oxidizing gas discharging manifold 124.

Specifically, the fuel gas discharging manifold 122 is formed at one side portion (hereinafter referred to as a "first side portion") of the cell stack body 70. When viewed from the thickness direction of the cell 10, the fuel gas discharging manifold 122 is constituted by a main body portion 122*a* having a substantially rectangular shape and an extending portion 122*b* formed to extend from the main body portion 122*a* toward the other side portion (hereinafter referred to as a "second side portion") of the cell stack body 70 and having a substantially rectangular shape. To be specific, the fuel gas discharging manifold 122 is formed to have a substantially L shape when viewed from the thickness direction of the cell 10. Moreover, the oxidizing gas discharging manifold 124 is constituted by a main body portion 124*a* having a substantially rectangular shape and an extending portion 124*b* formed to extend from the main body portion 124*a* toward the first side portion of the cell stack body 70 and having a substantially rectangular shape. To be specific, the oxidizing gas discharging manifold 124 is formed to have a substantially L shape when viewed from the thickness direction of the cell 10. Then, the concave portion 120 is formed such that a bottom surface thereof is formed by the extending portion 122*b* of the fuel gas discharging manifold 122 and the extending portion 124*b* of the oxidizing gas discharging manifold 124, and side surfaces thereof are formed by a stepped surface between the main body portion 122*a* and extending portion 122*b* of the fuel gas discharging manifold 122 and a stepped surface between the main body portion 124*a* and extending portion 124*b* of the oxidizing gas discharging manifold 124.

In other words, when viewed from the thickness direction of the cell 10, the fuel gas discharging manifold 122 is formed to have a substantially rectangular shape, and a corner portion thereof located on the second side portion (and the upper portion) side is cut out. Similarly, when viewed from the thickness direction of the cell 10, the oxidizing gas discharging manifold 124 is formed to have a substantially rectangular shape, and a corner portion thereof located on the first side portion (and the upper portion) side is cut out. Then, these cut-out portions form the concave portion 120.

The entire cooling medium discharging manifold 126 having a substantially rectangular shape is formed to fit in the concave portion 120 when viewed from the thickness direction of the cell 10. Here, the sentence "the entire cooling medium discharging manifold 126 is formed to fit in the concave portion 120" denotes that when viewed from the thickness direction of the cell 10, the fuel gas discharging manifold 122 and the oxidizing gas discharging manifold 124 are formed to wholly surround the cooling medium discharging manifold 126. Here, the phrase "wholly surround" denotes that as long as the operational advantages of the present invention can be obtained, there may be a portion where the fuel gas discharging manifold 122 and the oxidizing gas discharging manifold 124 do not surround the cooling medium discharging manifold 126. Moreover, it is preferable that when viewed from the vertical direction relative to the thickness direction of the cell 10, the fuel gas discharging manifold 122 and the oxidizing gas discharging manifold 124 surround a portion of the cooling medium discharging manifold 126 which portion is close to the atmosphere. In other words, it is preferable that the concave portion 120 be open to an inner side (herein, an upper side) of the cell 10.

In Embodiment 2, when viewed from the thickness direction of the cell 10, each of the fuel gas discharging manifold 122, the oxidizing gas discharging manifold 124, and the cooling medium discharging manifold 126 is formed to have a substantially rectangular shape but is not limited to this. These manifolds may have any shape as long as the fuel gas discharging manifold 122 and the oxidizing gas discharging manifold 124 form the concave portion 120, and at least a part of the cooling medium discharging manifold 126 is formed to fit in the concave portion 120. For example, when viewed from the thickness direction of the cell 10, each manifold may be formed to have a circular-arc shape.

Similarly, the fuel gas supplying manifold 121, the oxidizing gas supplying manifold 123, and the cooling medium supplying manifold 125 are formed at the upper portion of the cell stack body 70 so as to extend in the thickness direction of the cell 10 (in the stack direction of the cells 10). Then, when viewed from the thickness direction of the cell 10, the fuel gas supplying manifold 121 and the oxidizing gas supplying manifold 123 are formed to form a concave portion, and the concave portion is open to the inner side (herein, a lower side) of the cell 10. Then, the cooling medium supplying manifold 125 is formed to fit in the concave portion. In Embodiment 2, the fuel gas supplying manifold 121 and the oxidizing gas supplying manifold 123 are formed to form the concave portion, and the cooling medium supplying manifold 125 is formed to fit in the concave portion. However, the present embodiment is not limited to this. As long as the fuel gas supplying manifold 121, the oxidizing gas supplying manifold 123, and the cooling medium supplying manifold 125 are formed at the upper portion of the cell stack body 70 (for example, as long as the fuel gas supplying manifold 121, the oxidizing gas supplying manifold 123, and the cooling medium supplying manifold 125 are formed at a portion from an upper end of the cell stack body 70 up to a portion of half a length between the upper end and lower end of the cell stack body 70), modes thereof are not limited.

Even the fuel cell stack 101 according to Embodiment 2 configured as above can obtain the same operational advantages as the fuel cell stack 101 according to Embodiment 1. Moreover, even the fuel cell cogeneration system 100 including the fuel cell stack 101 according to Embodiment 2 can obtain the same operational advantages as the fuel cell cogeneration system 100 according to Embodiment 1.

Embodiment 3

Embodiment 3 of the present invention exemplifies a mode in which the cooling medium discharging manifold is formed to fit in the concave portion formed by the oxidizing gas discharging manifold.

Figure 6:
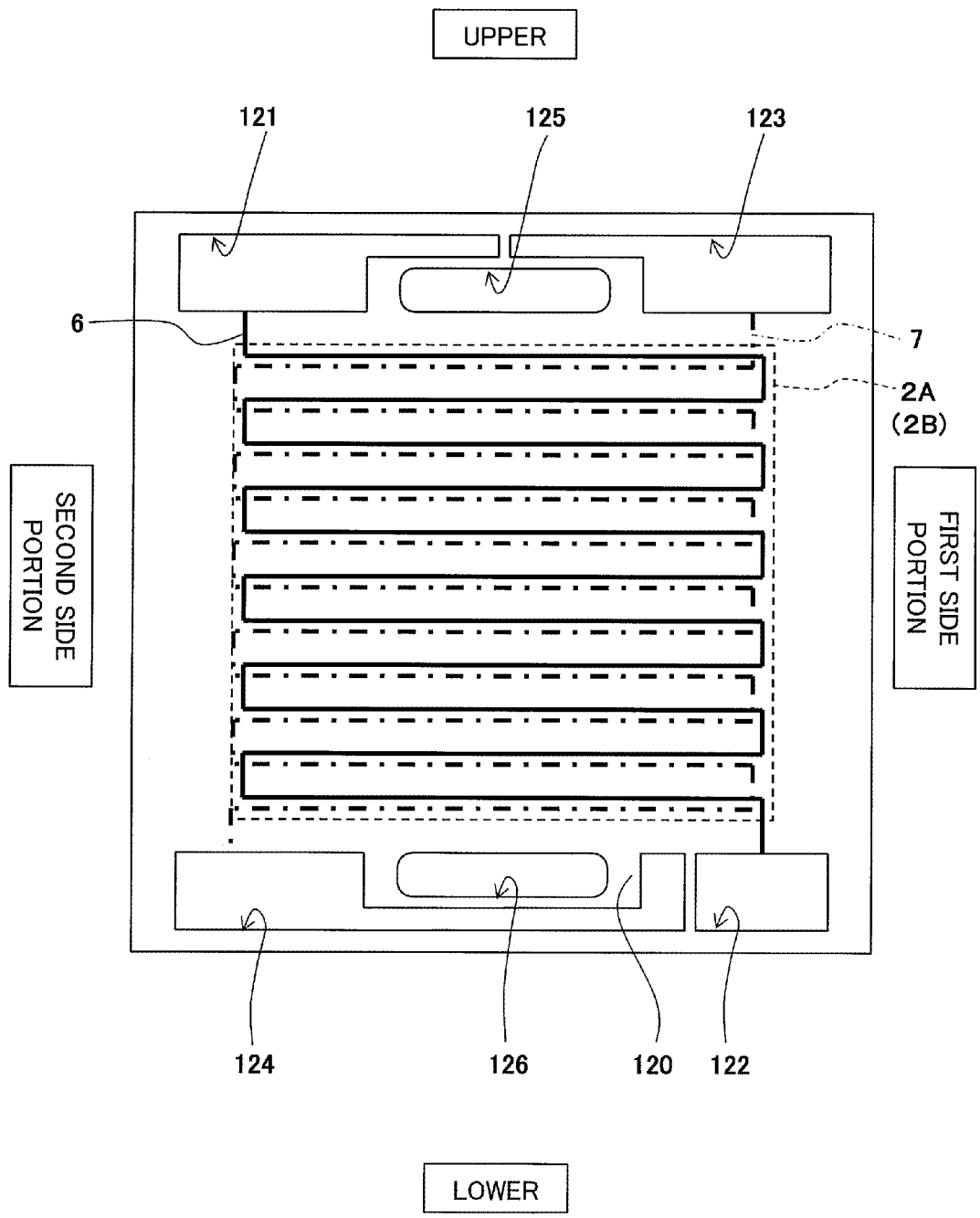
FIG. 6 is a transparent view of the cell stack body of the fuel cell stack according to Embodiment 3 of the present invention when viewed from the thickness direction of the cell.

FIG. 6 is a transparent view of the cell stack body of the fuel cell stack according to Embodiment 3 of the present invention when viewed from the thickness direction of the cell. In FIG. 6, the upper-lower direction of the cell stack body is shown as the upper-lower direction of the drawing, and a part of the cell stack body is omitted.

As shown in FIG. 6, the fuel cell cogeneration system 100 according to Embodiment 3 of the present invention is the same in basic configuration as the fuel cell cogeneration system 100 according to Embodiment 2 but is different from the fuel cell cogeneration system 100 according to Embodiment 2 in that when viewed from the thickness direction of the cell 10, the entire cooling medium discharging manifold 126 is formed to fit in the concave portion 120 formed by the oxidizing gas discharging manifold 124. Specifically, the fuel gas discharging manifold 122 is formed to have a substantially rectangular shape when viewed from the thickness direction of the cell 10. Moreover, the oxidizing gas discharging manifold 124 is formed to have a U shape when viewed from the thickness direction of the cell 10 so as to form the concave portion 120 and be open to the inner side (herein, the upper side) of the cell 10. Then, as with the cooling medium discharging manifold 126 of Embodiment 2, the cooling medium discharging manifold 126 herein is formed to have a substantially rectangular shape when viewed from the thickness direction of the cell 10 and fit in the concave portion 120.

Even the fuel cell stack 101 according to Embodiment 3 configured as above has the same operational advantages as the fuel cell stack 101 according to Embodiment 2. Moreover, in the fuel cell stack 101 according to Embodiment 3, the entire cooling medium discharging manifold 126 is formed to fit in the concave portion 120 formed by the oxidizing gas discharging manifold 124 through which the cathode off gas having a high gas flow rate and a large amount of heat flows. Therefore, a heat insulating effect of the cooling medium discharging manifold 126 becomes large. Further, even the fuel cell cogeneration system 100 including the fuel cell stack 101 according to Embodiment 3 can obtain the same operational advantages as the fuel cell cogeneration system 100 according to Embodiment 2.

Embodiment 4

Embodiment 4 of the present invention exemplifies a mode in which the cooling medium discharging manifold is formed to fit in the concave portion formed by the fuel gas discharging manifold.

Figure 7:
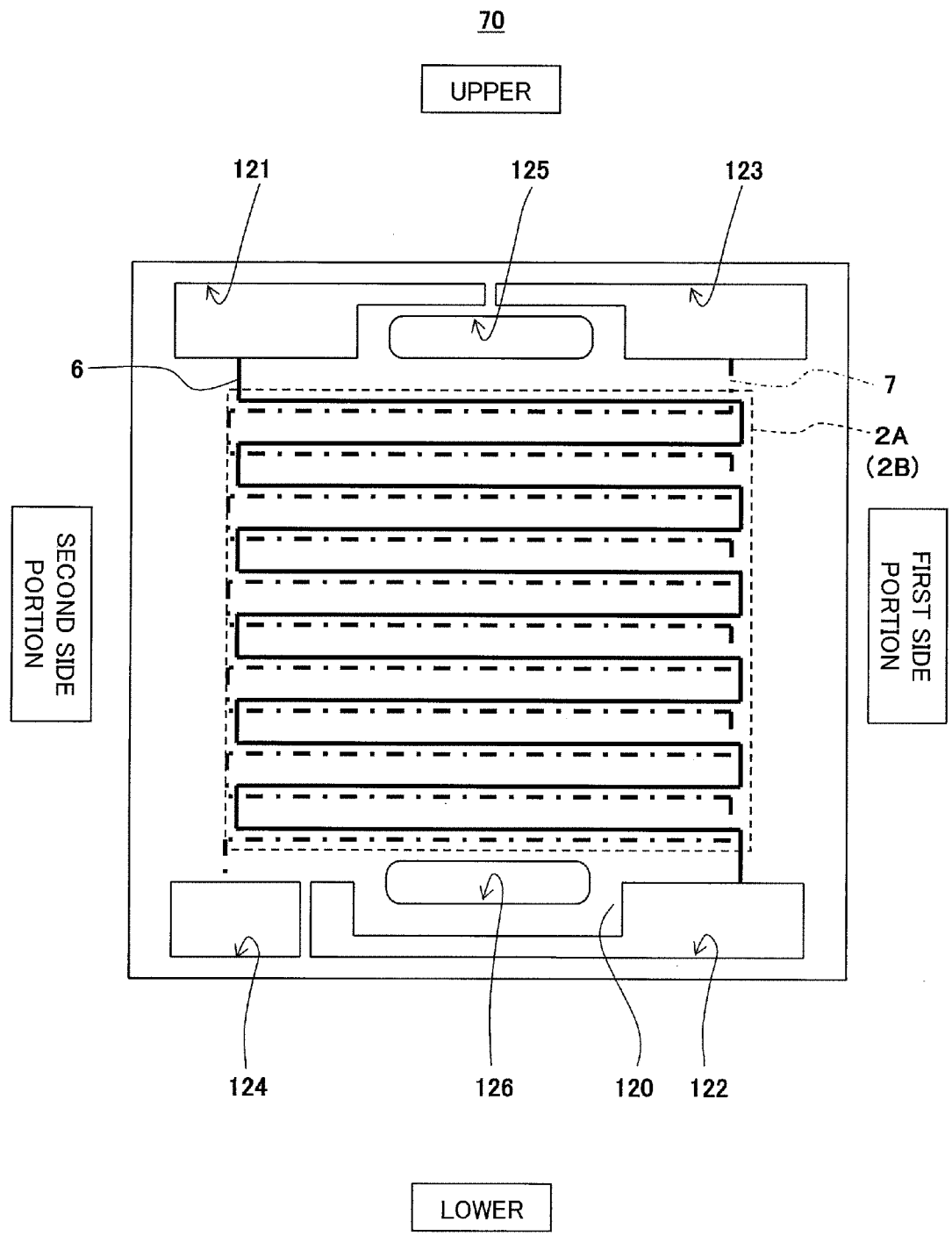
FIG. 7 is a transparent view of the cell stack body of the fuel cell stack according to Embodiment 4 of the present invention when viewed from the thickness direction of the cell.

FIG. 7 is a transparent view of the cell stack body of the fuel cell stack according to Embodiment 4 of the present invention when viewed from the thickness direction of the cell. In FIG. 7, the upper-lower direction of the cell stack body is shown as the upper-lower direction of the drawing, and a part of the cell stack body is omitted.

As shown in FIG. 7, the fuel cell cogeneration system 100 according to Embodiment 4 of the present invention is the same in basic configuration as the fuel cell cogeneration system 100 according to Embodiment 1 but is different from the fuel cell cogeneration system 100 according to Embodiment 1 in that when viewed from the thickness direction of the cell 10, the cooling medium discharging manifold 126 is formed such that at least a part thereof fits in the concave portion 120 formed by the fuel gas discharging manifold 122. Specifically, the fuel gas discharging manifold 122 is formed to have a substantially rectangular shape when viewed from the thickness direction of the cell 10. Moreover, the fuel gas discharging manifold 122 is formed to have a U shape when viewed from the thickness direction of the cell 10 so as to form the concave portion 120 and be open to the inner side (herein, the upper side) of the cell 10. Then, as with the cooling medium discharging manifold 126 of Embodiment 1, the cooling medium discharging manifold 126 herein is formed to have a substantially rectangular shape when viewed from the thickness direction of the cell 10 such that at least a part thereof fits in the concave portion 120.

Even the fuel cell stack 101 according to Embodiment 4 configured as above can obtain the same operational advantages as the fuel cell stack 101 according to Embodiment 2. Moreover, even the fuel cell cogeneration system 100 including the fuel cell stack 101 according to Embodiment 2 can obtain the same operational advantages as the fuel cell cogeneration system 100 according to Embodiment 2.

Embodiment 5

Embodiment 5 of the present invention exemplifies a mode in which the fuel cell stack is constituted by a so-called external manifold type fuel cell stack.

Figure 8:
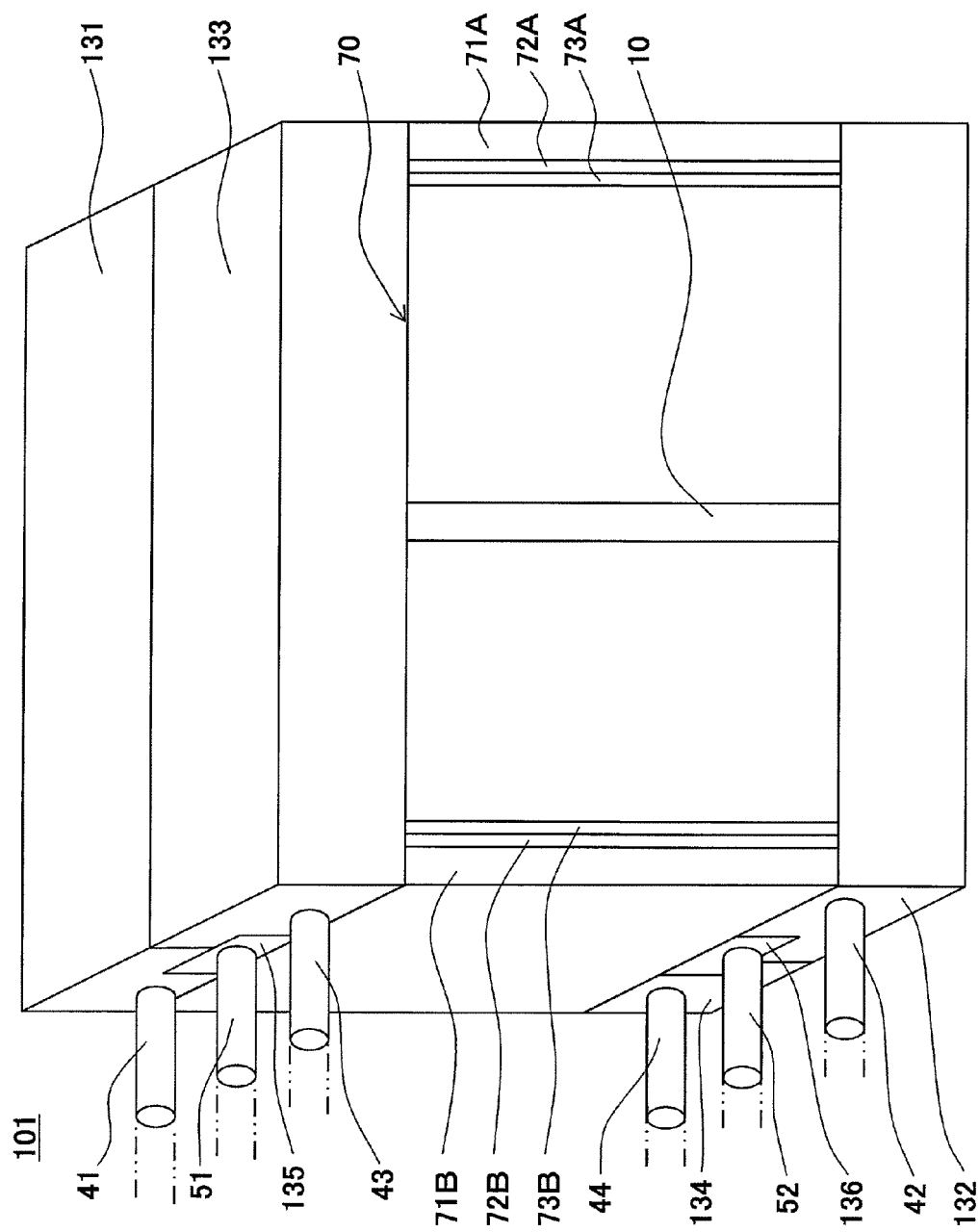
FIG. 8 is a perspective view schematically showing the schematic configuration of the fuel cell stack according to Embodiment 5 of the present invention.
Figure 9:
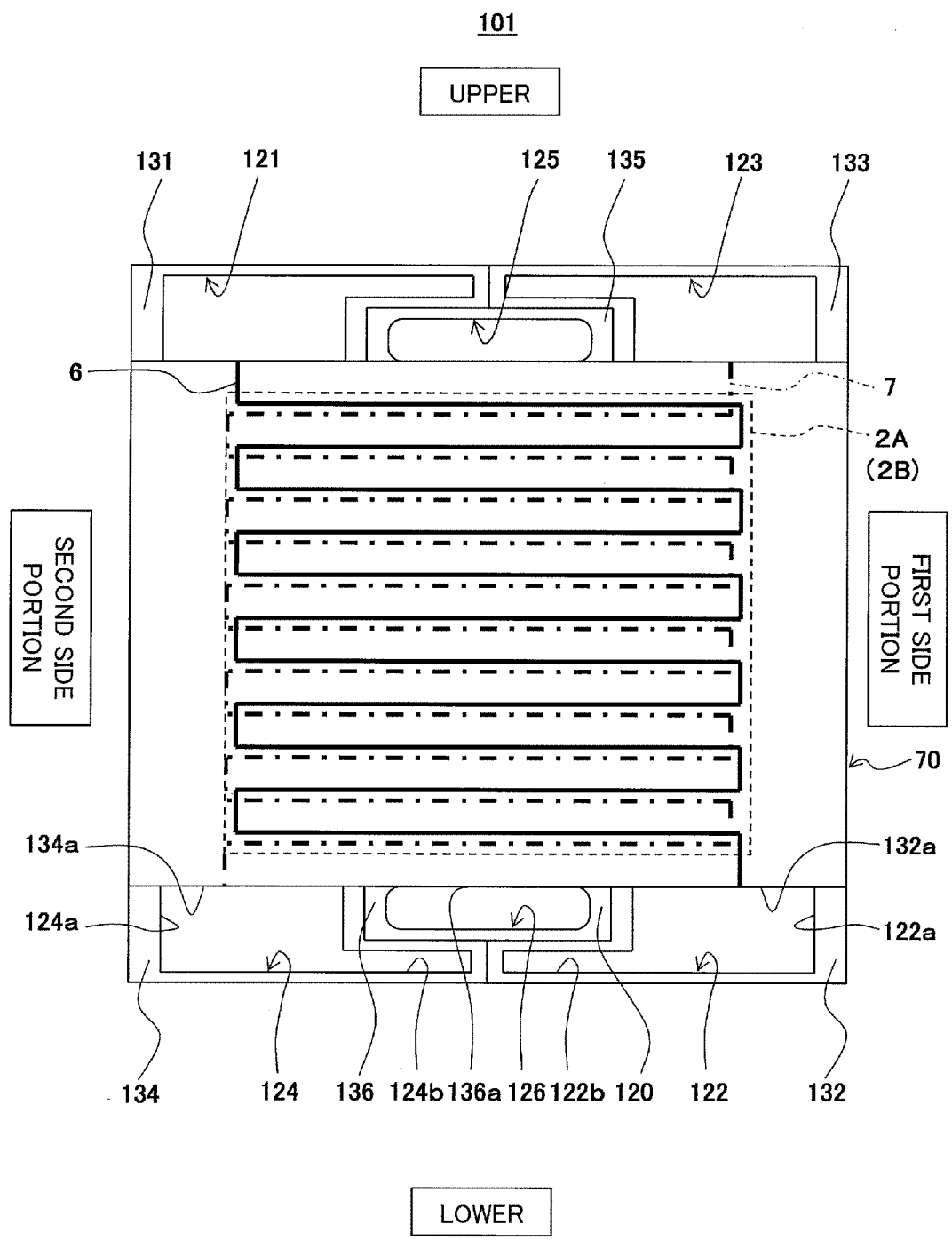
FIG. 9 is a transparent view of the fuel cell stack of FIG. 8 when viewed from the thickness direction of the cell.

FIG. 8 is a perspective view schematically showing the schematic configuration of the fuel cell stack of the fuel cell cogeneration system according to Embodiment 5 of the present invention. FIG. 9 is a transparent view of the fuel cell stack of FIG. 8 when viewed from the thickness direction of the cell. In FIG. 9, the upper-lower direction of the fuel cell stack 101 is shown as the upper-lower direction of the drawing, and a part of the fuel cell stack 101 is omitted.

As shown in FIGS. 8 and 9, the fuel cell cogeneration system 100 of the present invention is the same in basic configuration as the fuel cell cogeneration system 100 according to Embodiment 1 but is different from the fuel cell cogeneration system 100 according to Embodiment 1 in that the fuel cell stack 101 is constituted by the so-called external manifold type fuel cell stack in which box-shaped manifolds are formed outside the cell 10. Specifically, a first casing 131 on which the fuel gas supplying manifold 121 is formed, a third casing 133 on which the oxidizing gas supplying manifold 123 is formed, and a fifth casing 135 on which the cooling medium supplying manifold 125 is formed are provided on an upper portion of the fuel cell stack 101. Moreover, a second casing 132 on which the fuel gas discharging manifold 122 is formed, a fourth casing 134 on which the oxidizing gas discharging manifold 124 is formed, and a sixth casing 136 on which the cooling medium discharging manifold 126 is formed are provided on a lower portion of the fuel cell stack 101.

The second casing 132 is formed to extend in the thickness direction of the cell 10 and have a substantially L shape when viewed from the thickness direction of the cell 10. Moreover, the second casing 132 has an internal space 122. When viewed from the thickness direction of the cell 10, the internal space 122 is formed by the main body portion 122a having a substantially rectangular shape and the extending portion 122b formed to extend from the main body portion 122a toward the second side portion of the fuel cell stack 101 and having a substantially rectangular shape. To be specific, the internal space 122 is formed to have a substantially L-shaped cross section and extend in the thickness direction of the cell 10. The internal space 122 constitutes the fuel gas discharging manifold 122. Further, an opening 132a is formed on an upper surface of the second casing 132 so as to be communicated with the downstream end of the fuel gas channel 6.

Similarly, the fourth casing 134 is formed to extend in the thickness direction of the cell 10 and have a substantially L shape when viewed from the thickness direction of the cell 10. Moreover, the fourth casing 134 has an internal space 124. When viewed from the thickness direction of the cell 10, the internal space 124 is formed by the main body portion 124a having a substantially rectangular shape and the extending portion 124b formed to extend from the main body portion 124a toward the first side portion of the fuel cell stack 101 and have a substantially rectangular shape. To be specific, the internal space 124 is formed to have a substantially L-shaped cross section and extend in the thickness direction of the cell 10. The internal space 124 constitutes the oxidizing gas discharging manifold 124. Further, an opening 134a is formed on an upper surface of the fourth casing 134 so as to be communicated with the downstream end of the oxidizing gas channel 7.

Then, the second casing 132 and the fourth casing 134 form the concave portion 120 when viewed from the thickness direction of the cell 10, and the sixth casing 136 is disposed to fit the concave portion 120. The sixth casing 136 is formed to extend in the thickness direction of the cell 10 and have a substantially rectangular shape when viewed from the thickness direction of the cell 10. Moreover, the sixth casing 136 has an internal space 126. The internal space 126 is formed to have a substantially rectangular shape when viewed from the thickness direction of the cell 10 and extend in the thickness direction of the cell 10. The internal space 126 constitutes the cooling medium discharging manifold 126. To be specific, the entire cooling medium discharging manifold 126 is formed to fit in the concave portion 120 when viewed from the thickness direction of the cell 10. Further, an opening 136a is formed on an upper surface of the sixth casing 136 so as to be communicated with the downstream end of the cooling medium channel 8.

The first casing 131, the third casing 133, and the fifth casing 135 are respectively the same in configuration as the second casing 132, the fourth casing 134, and the sixth casing 136, so that detailed explanations thereof are omitted.

Even the fuel cell stack 101 according to Embodiment 5 configured as above can obtain the same operational advantages as the fuel cell stack 101 according to Embodiment 2. Moreover, even the fuel cell cogeneration system 100 including the fuel cell stack 101 according to Embodiment 5 can obtain the same operational advantages as the fuel cell cogeneration system 100 according to Embodiment 2.

In Embodiment 5, the concave portion 120 is formed by the second casing 132 on which the fuel gas discharging manifold 122 is formed and the fourth casing 134 on which the oxidizing gas discharging manifold 124 is formed. However, the present embodiment is not limited to this. The concave portion 120 may be formed only by the fourth casing 134 on which the oxidizing gas discharging manifold 124 is formed or only by the second casing 132 on which the fuel gas discharging manifold 122 is formed.

Moreover, each of the fuel gas discharging manifold 122 and the oxidizing gas discharging manifold 124 is formed to have a substantially L shape when viewed from the thickness direction of the cell 10, and the cooling medium discharging manifold 126 is formed to have a substantially rectangular shape when viewed from the thickness direction of the cell 10. However, the present embodiment is not limited to this. As with Embodiment 1, each of the fuel gas discharging manifold 122, the oxidizing gas discharging manifold 124, and the cooling medium discharging manifold 126 may have any shape as long as the concave portion 120 is formed by the fuel gas discharging manifold 122 and/or the oxidizing gas discharging manifold 124, and the cooling medium discharging manifold 126 is formed such that at least a part thereof fits in the concave portion 120. For example, each manifold may be formed to have a circular-arc shape when viewed from the thickness direction of the cell 10.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

The fuel cell stack of the present invention and the fuel cell cogeneration system including the fuel cell stack are useful in the fuel cell field since the amount of heat released from the cooling medium discharging manifold to the outside air can be reduced, and the heat recovery efficiency of the fuel cell stack, that is, the fuel cell cogeneration system can be improved.

REFERENCE SIGNS LIST 1 polymer electrolyte membrane
2A anode
2B cathode
3 electrode assembly
4A anode separator
4B cathode separator
5 gasket
6 fuel gas channel
7 oxidizing gas channel
8 cooling medium channel
10 cell
21 fuel gas supplying manifold hole
24 oxidizing gas discharging manifold hole
31 fuel gas internal channel
32 oxidizing gas internal channel
33 cooling medium internal channel
41 anode gas pipe
42 anode off gas pipe
43 cathode gas pipe
44 cathode off gas pipe
45 flue gas pipe
51 cooling medium pipe
52 off cooling medium pipe
53 heat medium circulating passage
61 heat insulating member
70 cell stack body
71A end plate
71B end plate
72A insulating plate
72B insulating plate
73A current collector
73B current collector
100 fuel cell cogeneration system
101 fuel cell stack
102 hydrogen generator
102A burner
103 first heat exchanger
104 second heat exchanger
105 third heat exchanger
106 fourth heat exchanger
107 air supplying device
108 cooling medium tank
109 heat utilizing device
110 control unit
120 concave portion
121 fuel gas supplying manifold
122 fuel gas discharging manifold
122a main body portion
122b extending portion
123 oxidizing gas supplying manifold
124 oxidizing gas discharging manifold
124a main body portion
124b extending portion
125 cooling medium supplying manifold
126 cooling medium discharging manifold
131 first casing
132 second casing
132a opening
133 third casing 134 fourth casing
134a opening
135 fifth casing
136 sixth casing
136a opening

The invention claimed is:

1. A fuel cell stack comprising:
a plurality of cells stacked, each of the plurality of cells including an anode and a cathode and being formed in a plate shape;
a fuel gas discharging manifold which extends in a thickness direction and through which an anode off gas unconsumed in the anode flows, the thickness direction being a direction perpendicular to a plane created by the anode and the cathode;
an oxidizing gas discharging manifold which extends in the thickness direction and through which a cathode off gas unconsumed in the cathode flows; and
a cooling medium discharging manifold which extends in the thickness direction and through which an off cooling medium having recovered heat from the plurality of cells flows, wherein:
at least one of the fuel gas discharging manifold and the oxidizing gas discharging manifold forms a concave portion when viewed from the thickness direction,
at least a part of the at least one of the cathode gas discharging manifold and the anode gas discharging manifold which forms the concave portion is disposed between the cooling medium discharging manifold and a separator end closest to the cooling medium discharging manifold, when viewed from the thickness direction, and
the cooling medium discharging manifold is disposed such that at least a part of the cooling medium discharging manifold fits in the concave portion when viewed from the thickness direction.

2. The fuel cell stack according to claim 1, wherein:
the fuel gas discharging manifold and the oxidizing gas discharging manifold form the concave portion, respectively, when viewed from the thickness direction, and
at least a part of the fuel gas discharging manifold and at least a part of the oxidizing gas discharging manifold are disposed between the cooling medium discharging manifold and the separator end when viewed from the thickness direction.

3. The fuel cell stack according to claim 1, wherein:
the oxidizing gas discharging manifold forms the concave portion when viewed from the thickness direction, and
at least a part of the oxidizing gas discharging manifold is disposed between the cooling medium discharging manifold and the separator end when viewed from the thickness direction.

4. The fuel cell stack according to claim 1, wherein:
the fuel gas discharging manifold forms the concave portion when viewed from the thickness direction, and
at least a part of the fuel gas discharging manifold is disposed between the cooling medium discharging manifold and the separator end when viewed from the thickness direction.

5. The fuel cell stack according to claim 1, wherein an entirety of the cooling medium discharging manifold fits in the concave portion.

6. The fuel cell stack according to claim 1, wherein the concave portion is open to an inner side of a cell.

7. The fuel cell stack according to claim 1, wherein the cooling medium discharging manifold overlaps the fuel gas discharging manifold and/or the oxidizing gas discharging manifold along a direction perpendicular to the separator end when viewed from the thickness direction.

8. The fuel cell stack according to claim 1, wherein the fuel cell stack is covered with a heat insulating member.

9. The fuel cell stack according to claim 1, wherein the fuel gas discharging manifold, the oxidizing gas discharging manifold, and the cooling medium discharging manifold are disposed inside the plurality of cells stacked.

10. The fuel cell stack according to claim 1, wherein the fuel gas discharging manifold, the oxidizing gas discharging manifold, and the cooling medium discharging manifold are disposed outside the plurality of cells stacked.

11. A fuel cell cogeneration system comprising:
the fuel cell stack according to claim 1;
an anode off gas pipe connected to a downstream end of the fuel gas discharging manifold from which the anode off gas is discharged;
a cathode off gas pipe connected to a downstream end of the oxidizing gas discharging manifold from which the cathode off gas is discharged;
an off cooling medium pipe connected to a downstream end of the cooling medium discharging manifold from which the off cooling medium is discharged; and
a heat exchanger configured to carry out heat exchange between the anode off gas and a heat medium or between the cathode off gas and the heat medium.

12. A fuel cell comprising:
a cell including an anode and a cathode and being formed in a plate shape;
a fuel gas discharging manifold which extends in a thickness direction and through which an anode off gas unconsumed in the anode flows, the thickness direction being a direction perpendicular to a plane created by the anode and the cathode;
an oxidizing gas discharging manifold which extends in the thickness direction and through which a cathode off gas unconsumed in the cathode flows; and
a cooling medium discharging manifold which extends in the thickness direction and through which an off cooling medium having recovered heat from the cell flows, wherein:
at least one of the fuel gas discharging manifold and the oxidizing gas discharging manifold forms a concave portion when viewed from the thickness direction,
at least a part of the at least one of the cathode gas discharging manifold and the anode gas discharging manifold which forms the concave portion is disposed between the cooling medium discharging manifold and a separator end closest to the cooling medium discharging manifold, when viewed from the thickness direction, and
the cooling medium discharging manifold is disposed such that at least a part of the cooling medium discharging manifold fits in the concave portion when viewed from the thickness direction.

13. The fuel cell according to claim 12, wherein:
the fuel gas discharging manifold and the oxidizing gas discharging manifold form the concave portion, respectively, when viewed from the thickness direction, and
at least a part of the fuel gas discharging manifold and at least a part of the oxidizing gas discharging manifold are disposed between the cooling medium discharging manifold and the separator end when viewed from the thickness direction.

14. The fuel cell according to claim 12, wherein:
the oxidizing gas discharging manifold forms the concave portion when viewed from the thickness direction, and at least a part of the oxidizing gas discharging manifold is disposed between the cooling medium discharging manifold and the separator end when viewed from the thickness direction.

15. The fuel cell according to claim 12, wherein:
the fuel gas discharging manifold forms the concave portion when viewed from the thickness direction, and
at least a part of the fuel gas discharging manifold is disposed between the cooling medium discharging manifold and the separator end when viewed from the thickness direction.

16. The fuel cell according to claim 12, wherein an entirety of the cooling medium discharging manifold fits in the concave portion.

17. The fuel cell according to claim 12, wherein the concave portion is open to an inner side of a cell.

18. The fuel cell according to claim 12, wherein the cooling medium discharging manifold overlaps the fuel gas discharging manifold and/or the oxidizing gas discharging manifold along a direction perpendicular to the separator end when viewed from the thickness direction.

19. The fuel cell according to claim 12, wherein the fuel cell stack is covered with a heat insulating member.

20. A fuel cell cogeneration system comprising:
the fuel cell according to claim 12;
an anode off gas pipe connected to a downstream end of the fuel gas discharging manifold from which the anode off gas is discharged;
a cathode off gas pipe connected to a downstream end of the oxidizing gas discharging manifold from which the cathode off gas is discharged;
an off cooling medium pipe connected to a downstream end of the cooling medium discharging manifold from which the off cooling medium is discharged; and
a heat exchanger configured to carry out heat exchange between the anode off gas and a heat medium or between the cathode off gas and the heat medium.

* * * * *